3,402,122
PREPARATION OF AN ABSORPTION MEDIUM FOR HYDROCARBON RECOVERY
Bennett L. Atwater, Elk Grove Township, and J. Robert Penisten, Palatine, Ill., assignors to Universal Oil Products Company, Des Plaines, Ill., a corporation of Delaware
Filed Dec. 5, 1966, Ser. No. 599,160
5 Claims. (Cl. 208—101)

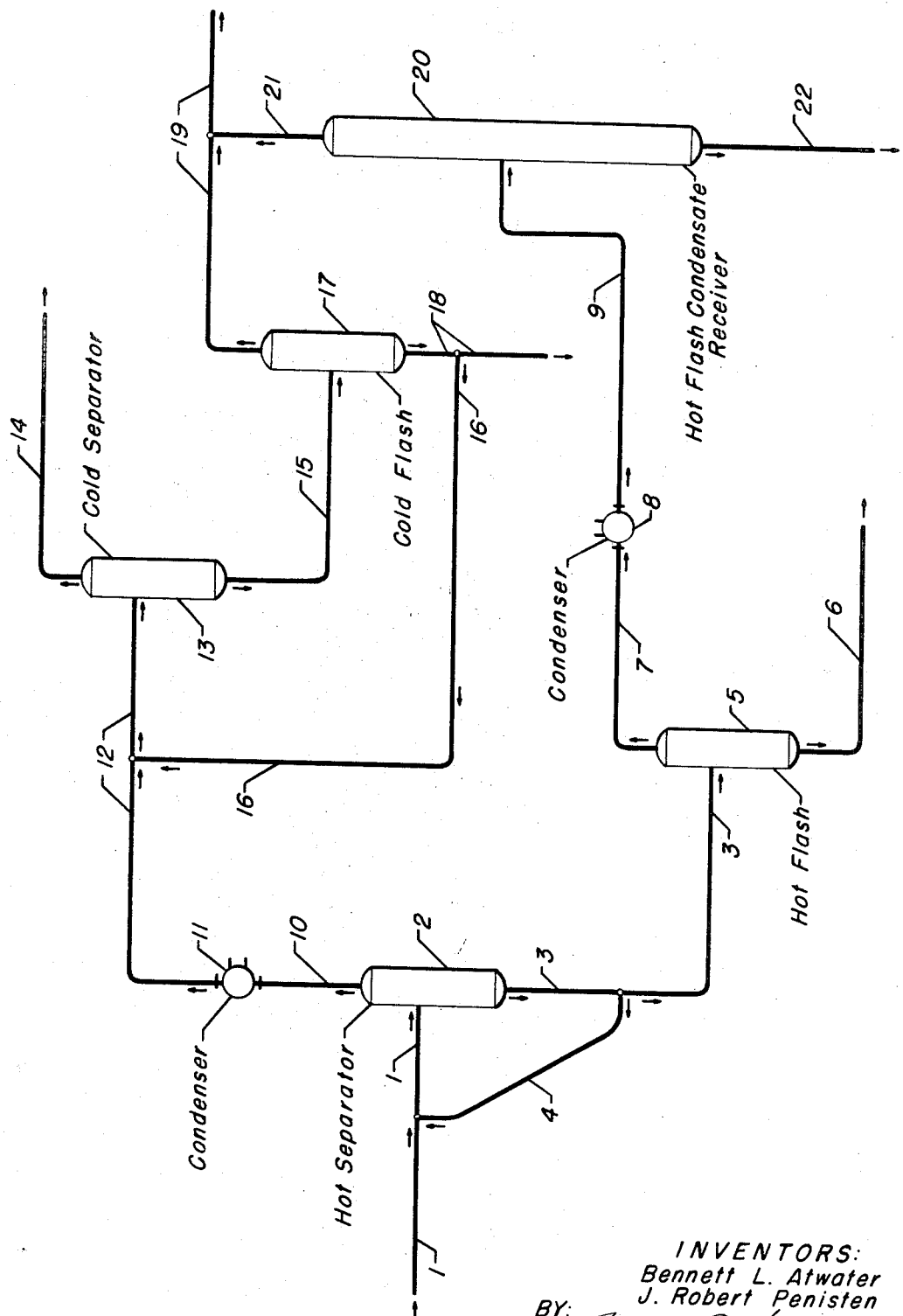

ABSTRACT OF THE DISCLOSURE

Multiple stage separation of mixed phase hydrocarbonaceous effluent from a hydrocracking and/or hydrorefining reaction zone. The reactor effluent is initially separated in a high temperature, high pressure separator to provide a first vapor phase and a first liquid phase. The first vapor phase is cooled and separated in a high pressure "cold" separator to provide a gaseous hydrogen-rich faction suitable for recycle to the reaction zone. The "cold" separator liquid bottoms is flashed to provide a $C_1$–$C_6$+ vapor fraction (I) and a $C_4$+ liquid fraction. The first liquid phase is subjected to a hot flash to provide a hot flash vapor fraction and a 400°–650° F.-plus liquid hydrocarbon bottoms fraction. The hot flash vapors are cooled and separated to provide a predominantly $C_2$-minus vapor fraction (II) and a $C_6$+ liquid fraction suitable for use as an absorption medium. Such absorption medium may be employed to recover $C_3$–$C_6$+ material from vapor fractions (I) and (II).

---

The present application involves a novel method for the preparation of a hydrocarbonaceous absorption medium for utilization in a hydrocarbon recovery system. More specifically, the present invention is directed toward a method for preparing an absorption medium from a mixed-phase hydrocarbonaceous conversion product effluent, containing hydrogen, acid gas, normally liquid hydrocarbons and normally gaseous hydrocarbons. The process described herein is uniquely adaptable to a process wherein the absorption medium is used to recover a concentrated hydrocarbon mixture reduced in acid gas concentration, and comprising propane and heavier hydrocarbons, while providing a gaseous mixture principally comprising methane, ethane, hydrogen and an acid gas.

As hereinafter set forth, the present method is advantageously integrated with a hydrocarbon conversion process which is generally classified as "hydrogen-consuming." Included in such conversion processes is the hydrorefining or hydrotreating of various hydrocarbon mixtures such as kerosene fractions, middle-distillate boiling range stocks, light and heavy vacuum gas oils, cycle oils, etc. The hydrorefining of such feed stocks is conducted for the primary purpose of reducing the concentration of various contaminating influences such as sulfurous compounds, nitrogenous compounds, metallic complexes, etc.; in addition, a significant degree of olefin saturation takes place. Another typical hydrogen-consuming, hydrocarbon conversion process is known in the petroleum refining art as hydrocracking; the object of this process is to convert relatively heavy hydrocarbons into lower boiling, substantially saturated hydrocarbon products such as gasoline and fuel oil fractions. Recent developments in petroleum technology have indicated that hydrocracking and/or hydrorefining techniques can individually or simultaneously be successfully applied to residual stocks, or so-called "black oils." Exemplary of this material are atmospheric tower bottoms products, vacuum residuum, crude oil residuum, topped or reduced crude oils, oils extracted from tar sands, etc. It will be noted that the hydrocracking and hydrorefining processes, above described in brief, share the common attributes of being hydrogen-consuming and of utilizing primarily those hydrocarbon charge stocks boiling above the gasoline boiling range—i.e having an initial boiling point above about 400° F. It is this type of hydrocarbon conversion process to which the present invention is most advantageously applicable.

The conversion product effluent, emanating from the hydrocracking and/or hydrorefining process, is in mixed phase, generally at a temperature of from 700° F. to about 950° F., and at a pressure (at the outlet of the conversion zone) within the range of from 700 p.s.i.g. to about 4,000 p.s.i.g. This product effluent is made up of gaseous components such as hydrogen, ammonia, hydrogen sulfide and light, normally gaseous hydrocarbons including methane, ethane and propane, and normally liquid hydrocarbons such as pentanes, hexanes, gasoline, middle-distillate, fuel oil, etc. In the present specification and the appended claims, butanes will be considered in the classification of normally liquid hydrocarbons since they are generally recovered as a desired product due to their blending value with respect to motor fuel. From the total product effluent, it is generally intended to recover at least the following as individual product streams: (1) a 650° F.-plus hydrocarbon fraction, suitable as fuel oil; (2) a 400° F.–650° F. middle-distillate for use as either fuel oil, or as charge to a hydrocracking unit designed for maximum LPG (liquified petroleum gas) production; (3) a gasoline boiling range fraction—hexanes to 400° F.—which may or may not contain pentanes and butanes; (4) a butane-pentane concentrate for use as a motor fuel blending component, or as a charge stock to an isomerization unit; (5) a gaseous phase rich in hydrogen to be recycled to the conversion zone for the purpose of supplying a portion of the hydrogen consumed therein; and, (6) a fuel gas waste product comprising methane and ethane, and being substantially free from the more valuable heavier hydrocarbons.

For the sake of convenience and simplification, and without the intent of unduly limiting the present invention beyond the scope and spirit of the appended claims, the following discussion will be directed to the application of the present invention to a process designed for the conversion of heavy hydrocarbonaceous material broadly classified as black oils. Black oils, particularly the heavy oils extracted from tar sands, topped or reduced crudes, and vacuum residuum, etc., contain high molecular weight sulfurous compounds in large quantities, excessive quantities of nitrogenous compounds, high molecular weight organo-metallic complexes comprising nickel and vanadium, and a considerable amount of asphaltic material. Currently, an abundant supply of such hydrocarbonaceous material exists, most of which has a gravity less than 20.0° API at 60° F., and a significant proportion of which has a gravity less than 10.0. This material is generally further characterized by a boiling range indicating that 10.0% or more, by volume, boils above a temperature of about 1050° F. Specific examples of such black oils include a vacuum tower bottoms product having a gravity of 7.1° API at 60° F., and containing 4.1% by weight of sulfur and 23.7% by weight of asphaltics; a "topped" Middle-east Kuwait crude oil, having a gravity of 11.0° API at 60° F., and containing 10.1% by weight of asphaltics and about 5.2% by weight of sulfur; and a vacuum residuum having a gravity of 8.8° API at 60° F., and containing 3.0% by weight of sulfur and 4300 p.p.m. of nitrogen, and having a 20.0% volumetric distillation point of 1055° F.

The hydrorefining/hydrocracking of such charge stocks results in a conversion product effluent containing hydrogen, an acid gas (hydrogen sulfide), mixed-phase lower boiling hydrocarbons and normally liquid hydrocarbons. The principal object of the present invention is to provide a process for preparing a hydrocarbonaceous absorption medium from this mixed-phase conversion product effluent.

Another object is to prepare an absorption medium from a conversion zone product effluent, which absorption medium may be utilized to recover valuable normally liquid hydrocarbons from a portion of said effluent principally comprising hydrogen, normally gaseous hydrocarbons and acid gas.

Typically, a mixed-phase conversion zone effluent is introduced, following the condensing thereof, into a high pressure separator in order to recover unreacted hydrogen for use as recycle within the process, followed by subsequent separation and recovery of distillable hydrocarbon products through the use of distillation means. It has been found, however, that the hydrocracking/hydrorefining of black oils produces large quantities of normally gaseous hydrocarbons, as well as hydrogen and acid gas, and that the normally liquid hydrocarbon portion of the effluent possesses high absorption capacity for such material. The presence of large quantities of hydrogen and light, normally gaseous hydrocarbons in solution with the relatively heavier hydrocarbons gives rise to the adverse situation by which high hydrogen loss is encountered and subsequent distillation facilities are necessarily excessively large in order to accommodate the tremendous vapor loadings within the columns. Thus, another object of our invention is to afford an absorption medium for use in recovering liquid hydrocarbons from a principally gaseous stream, concentrating the latter such that the hydrocarbons are not lost to the refiner and large quantities of vapors are not introduced into the fractionation facilities.

These and other objects are achieved through the use of the present invention hereinafter more completely described with reference to the accompanying drawing which is a simplified representation of one embodiment thereof.

In a broad embodiment, the inventive concept herein described affords a process for preparing an absorption medium from a hydrocarbonaceous conversion product effluent, which process comprises the steps of: (a) separating said conversion product effluent into a first vapor phase and a first liquid phase, in a first separation zone at a pressure substantially the same as said conversion product effluent, and at a temperature above about 700° F.; (b) separating said first liquid phase in a second separation zone at substantially the same temperature as said first separation zone, and at a reduced pressure below about 200 p.s.i.g., to provide a second vapor phase and a second liquid phase principally comprising hydrocarbons boiling above about 400° F.; (c) condensing said first vapor phase and separating the condensed vapors in a third separation zone at substantially the same pressure, and at a temperature of from 60° F. to about 140° F., to provide a third vapor phase comprising at least about 80.0 mol percent hydrogen and a third liquid phase; (d) separating said third liquid phase in a fourth separation zone at substantially the same temperature and a reduced pressure below about 200 p.s.i.g., to provide a fourth liquid phase principally comprising butanes and heavier normally liquid hydrocarbons and a fourth vapor phase; and, (e) condensing said second vapor phase and separating the condensed vapors in a fifth separation zone at a temperature in the range of about 60° F. to about 140° F. and a reduced pressure below about 200 p.s.i.g. to provide a fifth vapor phase principally comprising pentanes, butanes, propane and lighter gaseous hydrocarbons, and recovering said absorption medium as a fifth liquid phase principally comprising hexanes and heavier normally liquid hydrocarbons.

Other embodiments of our invention reside in particular operating conditions and in the use of specific internal recycle streams. The latter includes recycle of a portion of said fourth liquid phase to combine with the condensed first vapor phase, prior to separation of the latter in said third separation zone. Also, a portion of said first liquid phase is recycled to combine with the conversion product effluent, prior to separation in the first separation zone. The latter, herein referred to as a hot separator, is maintained at essentially the same pressure as the reaction product effluent being initially separated therein, and, for the various hydrogen-consuming conversion processes hereinbefore described, such pressure is in the range of from about 700 p.s.i.g. to about 4000 p.s.i.g. It is further preferred that the temperature of the reaction product effluent, as it enters this hot separator, is below about 750° F. At temperatures above 750° F., the heavier normally liquid hydrocarbons are carried over in the first vapor phase, whereas at temperatures below about 700° F., ammonium salts, resulting from the conversion of nitrogenous compounds contained within the hydrocarbonaceous charge stock, tend to fall into the liquid phase. Therefore, that portion of the first liquid phase being recycled is employed as a heat-exchange medium prior to being combined with the charge to the first separation zone. The third separation zone, although maintained under essentially the same pressure as the reaction product effluent and the hot separator, is at a temperature of from about 60° F. to about 140° F., and is referred to as a cold separator. Although the second and fourth separation zones may be maintained at substantially the same pressure, the pressure therein is substantially reduced from the pressure under which the hot and cold separators are maintained. Thus, although the pressure of the second and fourth separation zones will generally be superatmospheric, the maximum pressure will be about 200 p.s.i.g. The second separation zone, referred to as a hot flash zone, will, however, operate at an elevated temperature somewhat less than the temperature of the first liquid phase emanating from the first separation zone, and generally above about 700° F. On the other hand, the fourth separation zone, referred to as a cold flash zone, will operate at a significantly reduced temperature within the range of about 60° F. to about 140° F.

In order to provide a clear understanding of the present invention, several definitions of various terms and phrases employed herein are believed to be necessary and desirable. Reference to boiling points and temperature ranges, of various hydrocarbons and/or mixtures of hydrocarbons, are those obtained by ASTM Standard Distillation Methods. Likewise, the phrase "hexane to 400° F.," is intended to connote a mixture of liquid hydrocarbons boiling below a temperature of 400° F. and including hexanes. Similarly, the phrase "gasoline boiling range hydrocarbons," is intended to include liquid hydrocarbons boiling up to about 400° F. It is understood that the upper limit of gasoline, in some locales, is 425° F., or even 450° F., and that butanes are not considered normally liquid. However, for present purposes, "normally liquid gasoline hydrocarbons" is intended to include butanes, and have a nominal end boiling point of about 400° F.

The term, "pressure substantially the same as," is intended to mean that the pressure imposed upon a particular vessel is substantially the same as that upon an upstream vessel, allowing only for the normal pressure loss due to fluid flow through the system. Also, the phrase "temperature substantially the same as," is used to indicate that the reduction in temperature stems from normally experienced loss due to the flow of material, or from the conversion of sensible to latent heat by "flashing" where a pressure drop occurs.

The process can be further characterized in that said second separation zone is maintained at conditions of temperature and pressure selected to provide a second liquid phase comprising at least about 90.0% by volume of hydrocarbons boiling above a temperature of about 400° F. Further, the absorption medium prepared in accordance wtih the present process comprises at least about 85.0% by volume of hexanes and heavier hydrocarbons, and is, therefore, extremely well suited for use in recovering pentanes, butanes and propane from a principally vaporous stream. In the specific illustration which follows, the absorption medium reduces the concentration of $C_3$-plus hydrocarbons in a waste gas to less than 5.0 mol percent.

Through the use of the foregoing various embodiments, as hereinafter indicated in greater detail, five principal product streams are obtained. A first product stream is a principally gaseous phase containing more than about 80.0% by volume of hydrogen; it is, therefore, advantageously utilized as a recycle stream to supply a portion of the hydrogen consumed in the conversion zone. A second product stream comprises normally liquid hydrocarbons boiling above about 400° F., generally considered the end boiling point of gasoline fractions; in the example which follows, this normally liquid stream comprises about 96.0% by volume of 400° F.-plus hydrocarbons. As such, it may be suitably fractionated for the purpose of obtaining selected fractions thereof. A third product stream, also principally comprising normally liquid hydrocarbons, about 81.3 mol percent (94.8 wt. percent) butane-plus, is produced, and may be subjected to stabilization for the purpose of recovering a concentrated gasoline fraction.

The fourth product stream is the absorption medium, and, as set forth following, comprises about 93.5 mol percent hexane-plus hydrocarbons, and may be used to remove hydrocarbons from the fifth product stream, comprising about 9.5 mol percent propane and heavier hydrocarbons, such that this product stream contains only about 1.0 mol percent propane-plus, of which the greater proportion is propane.

From the foregoing brief description, it will be readily ascertained by those possessing skill in the art of petroleum processing techniques, that the present invention comprises a series of integrated steps for the preparation of an absorption medium from a mixed-phase reaction product effuent in an easy and economical manner. As hereinbefore set forth, the present invention is adaptable to processes designed for the conversion of black oils. Those skilled in the art, however, will recognize the fact that the novel process of the present invention is equally applicable to various reaction product effluent streams which may be obtained from sources other than the conversion of such hydrocarbon black oils. In describing the present invention for the preparation of the absorption medium from a conversion reaction product effluent, the conversion of the previously described black oils will be used. The conversion of black oils is generally intended to accomplish primarily two objects: first, to desulfurize the black oil to the extent dictated by the desired end result, whether maximizing fuel oil, or gasoline boiling range hydrocarbons; secondly, it is intended to produce "distillable hydrocarbons," being those normally liquid hydrocarbons including pentanes, and for present purposes butanes, having boiling points below about 1050° F. The conversion conditions are intended to include temperatures above about 600° F., with an upper limit of about 800° F., as measured at the inlet to the fixed-bed of catalyst disposed within the reaction zone. Since the bulk of the reactions being effected are exothermic, the reaction zone effluent will be at a higher temperature. In order that catalyst stability be preserved, it is preferred to control the inlet temperature at a level such that the temperature of the reaction product effluent does not exceed 950° F. Hydrogen is admixed with the black oil charge stock, by means of compressive recycle, in an amount usually less than about 10,000 s.c.f./bbl., at the selected operating pressure; the hydrogen is present in the recycle gaseous phase preferably in an amount of about 80.0% or more. A preferred range of the quantity of hydrogen being admixed with the fresh black oil charge stock is from about 3000 to about 8000 s.c.f./bbl. The conversion reaction zone will be maintained at a pressure greater than about 700 p.s.i.g., and generally in the range of about 1500 p.s.i.g. to about 3000 p.s.i.g. The black oil passes through the catalyst at a liquid hourly space velocity (defined as volumes of liquid hydrocarbon charge per hour, as measured at 60° F., per volume of catalyst disposed within the reaction zone) of from about 0.25 to about 2.0.

As hereinbefore set forth, hydrogen is employed in admixture with the charge stock, and preferably in an amount of from about 3000 to about 8000 s.c.f./bbl. The hydrogen-containing gaseous phase, herein sometimes designated as "recycle hydrogen" since it is conveniently recycled externally of the conversion zone, fulfills a number of various functions; it serves as a hydrogenating agent, a heat carrier, and particularly a means for stripping converted material from the catalytic composite, thereby creating still more available catalytically active sites for the incoming, unconverted hydrocarbon charge stock. In view of the fact that some hydrogenation will be effected, there will be a net consumption of hydrogen; to supplement this, hydrogen must be added to the system from a suitable external source. However, as a result of the incorporation of the present process whereby the quantity of hydrogen being removed from the reaction section is considerably decreased, the amount of make-up hydrogen necessarily added is also decreased. The catalytic composite disposed within the reaction zone can be characterized as comprising a metallic component possessing hydrogenation activity, which component is composited with a refractory inorganic oxide carrier material which may be of either synthetic or natural origin. The precise composition and method of manufacturing the catalytic composite is not considered to be an essential element of the present process.

Other conditions and preferred operating techniques will be given in conjunction with the following description of one embodiment incorporating the absorption medium preparation process of the present invention. In further describing this process, reference will be made to the accompanying figure which is presented for the sole purpose of illustration. In the drawing, the embodiment is presented by means of a simplified flow diagram in which such details as pumps, instrumentation and controls, heat-exchange and heat-recovery circuits, valving, start-up lines and similar hardware have been omitted as being non-essential to an understanding of the techniques involved. The use of such miscellaneous appurtenances, to modify the illustrated process flow, are well within the purview of those skilled in the art.

For the purpose of demonstrating the illustrated embodiment, and the utilization therein of the process of the present invention, the drawing will be described in connection with the conversion of a vacuum residuum having a gravity of 8.8° API at 60° F., and an ASTM 20.0% volumetric distillation temperature of 1055° F. In addition, the description will be directed toward a commercially-scaled unit having a capacity of 10,000 bbl./day. It is to be understood that the charge stock, stream compositions, operating conditions, design of fractionators, separators and the like are exemplary only, and may be varied widely without departure from the spirit of my invention, the scope of which is defined by the appended claims. Other charge stock properties are presented in the following Table I:

TABLE I.—VACUUM RESIDUUM PROPERTIES

| | |
|---|---|
| Gravity, °API at 60° F. | 8.8 |
| Distillation, D1160, °F.: | |
| Initial Boiling point | 690 |
| 2% | 860 |
| 5% | 950 |
| 10% | 1000 |
| 20% | 1055 |
| Sulfur, wt. percent | 3.0 |
| Nitrogen, total p.p.m. | 4300 |
| Heptane insolubles, wt. percent | 6.5 |

This vacuum residuum is intended to be converted into 80.0% by weight of hydrocarbon products recoverable by standard distillation in comonly used fractionation facilities. Furthermore, it is intended that this object be accomplished with minimal production of methane and ethane, and minimal loss of propane as a gaseous waste product. Obviously, a corollary object is to maximize the recovery of normally liquid hydrocarbons, inclusive of butanes. The vacuum residuum is processed in a fixed-bed catalytic conversion zone in admixture with 5000 s.c.f./bbl. of hydrogen, at an inlet pressure of about 2700 p.s.i.g. and an inlet temperature of about 800° F. The liquid hourly space velocity, based upon fresh liquid feed only, is 0.5, and the combined feed ratio with respect to total liquid feed is 2.0.

With reference now to the drawing, the conversion product effluent, in mixed phase, at a temperature of about 875° F. and under a pressure of about 2550 p.s.i.g., is introduced into the present process via line 1, passing therethrough into hot separator 2. The total conversion product effluent, in the application being illustrated, stems from a conversion zone charge of 4,100 lbs./hr. of a make-up hydrogen stream, 27,900 lbs./hr. of a recycled hydrogen-rich stream (line 14 in the drawing) 147,000 lbs./hr. of fresh vacuum residuum charge and 134,000 lbs./hr. of a hot recycle from hot separator 2. This is not illustrated in the embodiment presented in the drawing. The conversion product effluent is an amount of 313,000 lbs./hr., of which 73,300 lbs./hr. is vaporous.

Prior to entering hot separator 2, the effluent is employed as a heat-exchange medium, not illustrated, in order to lower its temperature, and is then combined with 142,-000 lbs./hr. of hot separator recycle. The latter, after use as a heat-exchange medium, is at a temperature of about 400° F. The temperature, therefore, of the material entering hot separator 2 is 750° F. A principally liquid phase is withdrawn from hot separator 2 via line 3 in an amount of about 394,400 lbs./hr., while 60,500 lbs./hr. are removed as a principally vaporous phase through line 10.

Of the total liquid withdrawn via line 3 from hot separator 2, 118,400 lbs./hr. continues therethrough into hot flash zone 5. Of the remainder, 142,000 lbs./hr. is diverted through line 4, and after use as a heat-exchange medium, whereby the temperature is lowered to about 400° F., continues therethrough to combine with the conversion product effluent in line 1, forming thereby the total charge (at about 750° F.) to hot separator 2. A total of about 134,000 lbs./hr. of the hot separator liquid in line 3 is recycled while hot to combine with the fresh charge stock to the conversion zone. Since this is not essential to the present invention, the recycle system is not illustrated in the drawing.

In the following Table II, the hot separator stream analyses are presented. For the sake of simplification, no analysis is given for the stream in line 4; this material remains substantially unchanged, and the actual amount thereof (in this illustration, 142,000 lbs./hr.) is determined on the basis of the temperature of the material entering hot separator 2. Component analyses are presented for the conversion zone effluent (line 1), the net liquid phase (line 3 entering hot flash zone 5) and the first principally vaporous phase (line 10). The values are given, for convenience, in terms of mols/hr.

TABLE II.—HOT SEPARATOR STREAM ANALYSES

| Line No | 1 | 3 | 10 |
|---|---|---|---|
| Component, mols/hr.: | | | |
| Ammonia | 17 | | 17 |
| Nitrogen | 31 | 1.0 | 29 |
| Hydrogen Sulfide | 247 | 13.7 | 217 |
| Hydrogen | 4,175 | 160.0 | 3,834 |
| Methane | 594 | 26.4 | 539 |
| Ethane | 129 | 9.8 | 108 |
| Propane | 110 | 8.5 | 93 |
| Butanes | 68 | 6.2 | 55 |
| Pentanes | 31 | 3.4 | 23 |
| Hexane, 400° F | 149 | 26.5 | 93 |
| 400° F.-700° F | 215 | 75.8 | 53 |
| 700° F.-1,100° F | 308 | 142.4 | 5 |
| 1,100° F. plus | 96 | 45.2 | |
| Totals | 6,169 | 518.9 | 5,066 |

The first principally vaporous phase in line 10 (60,500 lbs./hr.), is condensed in condenser 11, passes through line 12, and after being admixed with a portion of a fourth liquid stream in line 16 (155,000 lbs./hr.), is introduced into cold separator 13 at a temperature of about 120° F., and a pressure of about 2500 p.s.i.g. Since the hydrogen concentration in the condensed vapor phase in line 12 is about 67.1 mol percent, cold separator 13 serves to concentrate the hydrogen, and is aided in this function by the recycled material in line 16. The source of the latter is hereinafter described. A hydrogen-rich gaseous phase is withdrawn via line 14 (27,900 lbs./hr.), and a principally liquid phase is withdrawn via line 15 (187,230 lbs./hr.). The component analyses of the total charge to cold separator 13 inclusive of the recycle material in line 16 (line 12), the liquid phase removed therefrom (line 15) and the hydrogen-rich recycle gaseous phase (line 14), are presented in the following Table III:

TABLE III.—COLD SEPARATOR STREAM ANALYSES

| Line No | 12 | 15 | 14 |
|---|---|---|---|
| Component, mols/hr.: | | | |
| Ammonia | 17 | | |
| Nitrogen | 29 | 2 | 27 |
| Hydrogen Sulfide | 321 | 185 | 136 |
| Hydrogen | 3,840 | 140 | 3,700 |
| Methane | 556 | 104 | 452 |
| Ethane | 139 | 65 | 74 |
| Propane | 160 | 102 | 58 |
| Butanes | 194 | 117 | 30 |
| Pentanes F | 91 | 82 | 9 |
| Hexane, 400° | 602 | 595 | 7 |
| 400° F.-700° F5 | 378 | 378 | |
| 700° F.-1,100° F | 35 | 35 | |
| 1,100° F. plus | | | |
| Totals | 6,315 | -1,8 | 4,493 |

As indicated in the table, the cold separator 13 produces a gaseous phase comprising about 82.5 mol percent hydrogen. Of further interest is the fact that this stream contains only about 1.0% by volume of butanes and heavier hydrocarbons, and, considering the propane, this stream contains only about 2.3% by volume of propane and heavier hydrocarbons. It should be noted also that the cold separator liquid stream in line 15 comprises about 66.7 volume percent butanes and heavier hydrocarbons. Of interest is the fact that the recycle gas stream analysis indicates that the end boiling point of the 7.0 mols/hr. of hexane-400° F. material is about 300° F.

The principal function of cold flash zone 17 is to further concentrate the butanes and heavier hydrocarbons from the third liquid phase in line 15. Thus, cold flash zone 17 is maintained at about 200 p.s.i.g., and a temperature of about 120° F. In actual operation, the temperature is slightly lower due to loss in transporting the material from cold separator 13 through line 15. A principally vaporous phase is removed via line 19 (6,750 lbs./hr.) and a liquid phase comprising about 94.5 wt. percent butanes and heavier hydrocarbons is withdrawn via line 18. Component stream analyses for the separation being effected in cold flash zone 17 are presented in the following Table IV. Analyses are indicated for the vapor phase (line 19), the portion of the fourth liquid phase being recycled to the cold separator (line 16) and the net liquid phase in an amount of 25,480 lbs./hr. (line 18). Obviously, the total liquid from cold flash zone 17 is the sum of the last two mentioned streams.

TABLE IV.—COLD FLASH ZONE STREAM ANALYSES

| Line No. | 19 | 16 | 18 |
|---|---|---|---|
| Component, mols/hr.: | | | |
| Ammonia | | | |
| Nitrogen | 1.5 | | |
| Hydrogen sulfide | 63.8 | 104 | 17.3 |
| Hydrogen | 133.2 | 6 | 0.8 |
| Methane | 82.8 | 18 | 3.1 |
| Ethane | 29.0 | 31 | 5.1 |
| Propane | 23.0 | 67 | 11.8 |
| Butanes | 10.4 | 92 | 14.0 |
| Pentanes | 3.2 | 68 | 11.2 |
| Hexane, 400° F. | 2.5 | 509 | 78.0 |
| 400° F.-700° F. | | 325 | 53.2 |
| 700° F.-1,100° F. | | 30 | 4.4 |
| 1,100° F. plus | | | |
| Totals | 349.4 | 1,250 | 203.9 |

With respect to the fourth liquid phase in line 18, on a volumetric basis, it should be noted that 81.3% comprises butanes and heavier hydrocarbons (94.8% on a weight basis). Also, the hydrogen has been further concentrated in the principally gaseous phase in line 19. In the net liquid stream, the hydrogen, methane and ethane constitute only 4.4 mol percent, taking into accout 17.3 mols/hr. of hydrogen sulfide. The latter, will be recognized by those having expertise in the art, is readily removed by relatively simple techniques such as stripping, absorption, etc.

Hot flash zone 5, into which the first liquid phase from hot separator 2 is introduced via line 3, functions at the significantly reduced pressure of about 65 p.s.i.g., the temperature of the material in line 3 being about 735° F. The principal purpose of hot flash zone 5 is to concentrate the 400° F.-plus hydrocarbons as a second principally liquid phase, shown in the drawing as line 6 (100,000 lbs./hr.) and to provide a second vapor phase rich in material boiling below about 400° F. Furthermore, where the desired end result is to maximize the quantity of gasoline and middle-distillate hydrocarbons, hot flash zone 5 serves to concentrate the 1050° F.-plus residuum material. The vapor phase is withdrawn from hot flash zone 5 through line 7 (18,400 lbs./hr.) is condensed in condenser 8, and continues through line 9 into the hot flash condensate receiver 20.

In the following Table V, the stream analyses with respect to hot flash zone 5 are shown; for convenience, the analysis of the material in line 3 (as shown in Table II) is repeated:

TABLE V.—HOT FLASH ZONE STREAM ANALYSES

| Line No. | 3 | 6 | 7 |
|---|---|---|---|
| Component, mols/hr.: | | | |
| Ammonia | | | |
| Nitrogen | 1.0 | | 1.0 |
| Hydrogen sulfide | 13.7 | 0.2 | 13.5 |
| Hydrogen | 160.0 | 1.6 | 158.4 |
| Methane | 26.4 | 0.3 | 26.1 |
| Ethane | 9.8 | 0.3 | 9.5 |
| Propane | 8.5 | 0.3 | 8.2 |
| Butanes | 6.2 | 0.3 | 5.9 |
| Pentanes | 3.4 | 0.2 | 3.2 |
| Hexane, 400° F. | 26.5 | 3.5 | 23.0 |
| 400° F.-700° F. | 75.8 | 35.4 | 40.4 |
| 700° F.-1,100° F. | 142.4 | 131.4 | 11.0 |
| 1,100° F. plus | 45.2 | 45.2 | |
| Totals | 518.9 | 218.7 | 300.2 |

It will be noted that the liquid phase in line 6 contains 96.7 mol percent of 400° F.-plus hydrocarbons, and only about 1.5 mol percent of pentanes and lighter material. As such, this second liquid phase is well suited for further separation by common fractionation means, and, as a result of the extremely low concentration of light material, can be separated in a simple, economical system.

The condensed vapor phase in line 9 (18,400 lbs./hr.), being passed into receiver 20, comprises 30.5 mol percent propane and heavier hydrocarbons, 27.8 mol percent butanes and heavier hydrocarbons, 24.8 mol percent hexane and heavier hydrocarbons and 69.5 mol percent ethane and lighter gaseous components. The function, therefore, of condensate receiver 20 is to concentrate the light ends in a fifth vapor phase, shown as line 21 in the drawing, and to prepare a substantially hexane-plus hydrocarbon absorption medium, shown as line 22 in the drawing. The conditions within the hot condensate receiver include a pressure of about 60 p.s.ig., and the material in line 9 is at a temperature of about 120° F. A fifth vapor phase, in an amount of 2,400 lbs./hr., is removed via line 21, and the absorption medium, principally hexane-plus hydrocarbons, in an amount of 16,000 lbs./hr., is removed via line 22. The component analyses of the absorption medium in line 22, and the vaporous phase in line 21, are presented in the following Table VI:

TABLE VI.—CONDENSATE RECEIVER STREAM ANALYSES

| Line No. | 21 | 22 |
|---|---|---|
| Component, mols/hr.: | | |
| Ammonia | | |
| Nitrogen | 1.0 | |
| Hydrogen Sulfide | 12.7 | 0.8 |
| Hydrogen | 158.2 | 0.2 |
| Methane | 25.9 | 0.2 |
| Ethane | 9.1 | 0.4 |
| Propane | 7.4 | 0.8 |
| Butanes | 4.6 | 1.3 |
| Pentanes | 1.9 | 1.3 |
| Hexane, 400° F. | 2.0 | 21.0 |
| 400° F.-700° F. | | 40.4 |
| 700° F.-1,100° F. | | 11.0 |
| 1,100° F. plus | | |
| Totals | 222.8 | 77.4 |

The values shown in the above Table VI indicate clearly the function of hot flash condensate receiver 20. The absorption medium produced constitutes 93.7 mol percent hexanes and heavier hydrocarbons, and has, as hereinbefore set forth, a great capacity for the absorption of propane, butanes, and heavier normally liquid hydrocarbons contained within a principally vaporous gaseous phase. It should also be noted that the gaseous phase in line 21 comprises about 93.0 mol percent methane, ethane and other normally gaseous constituents.

By way of an example to illustrate the use of the absorption medium prepared as hereinabove described (line 22), it will be presumed that the combined fourth and fifth vapor phases (lines 19 and 21 respectively) would normally be a portion of the total material introduced into the stabilization and/or fractionation facilities. In the following Table VII, the combined analysis of the fourth and fifth vapor phases is shown as the "rich gas" stream. The gaseous phase which will be removed from the process, either as a waste, or fuel gas, is indicated as the "lean gas" stream.

TABLE VII.—RICH GAS/LEAN GAS ANALYSES

| Stream, mols/hr. | Rich Gas | Lean Gas |
|---|---|---|
| Ammonia | | |
| Nitrogen | 2.5 | 2.5 |
| Hydrogen Sulfide | 76.5 | 58.3 |
| Hydrogen | 291.4 | 291.4 |
| Methane | 108.7 | 104.9 |
| Ethane | 38.1 | 32.1 |
| Propane | 30.4 | 15.8 |
| Butanes | 15.0 | 3.7 |
| Pentanes | 5.1 | 1.1 |
| Hexanes, 400° F. | 4.5 | 0.9 |
| 400° F.-700° F. | | |
| 700° F.-1,100° F. | | |
| 1,100° F. plus | | |
| Totals | 572.2 | 510.7 |

From the analyses given in Table VII, it will be seen that the concentration of ethane and lighter material in the rich gas, about 90.4 mol percent, has been increased to about 96.3 mol percent in the lean gas. Of further significance is the fact that only about 1.1 mol percent butanes and heavier hydrocarbons have been lost in this gaseous waste product.

The foregoing specification indicates the method by which the absorption medium is prepared from a hydrocarbonaceous conversion product effluent, and the subsequent use thereof in recovering valuable hydrocarbons from the product effluent.

We claim as our invention:

1. A process for preparing an adsorption medium from a mixed phase hydrogen-containing hydrocarbonaceous conversion product effluent from a hydrocracking and/or hydrorefining reaction zone and for separately recovering from said effluent a gaseous hydrogen-rich fraction and a liquid $C_4+$ hydrocarbon fraction, which process comprises the steps of:
    (a) separating said conversion product effluent into a first vapor phase and a first liquid phase, in a first separation zone at a pressure substantially the same as said conversion product effluent, and at a temperature above about 700° F.;
    (b) separating said first liquid phase in a second separation zone at substantially the same temperature as said first separation zone, and at a reduced pressure below about 200 p.s.i.g., to provide a second liquid phase principally comprising hydrocarbons boiling above about 400° F. and a second vapor phase;
    (c) condensing said first vapor phase and separating the condensed vapors in a third separation zone at substantially the same pressure, and at a temperature of from about 60° F. to about 140° F., to provide as said hydrogen-rich fraction a third vapor phase comprising at least about 80.0 mol percent hydrogen and a third liquid phase;
    (d) separating said third liquid phase in a fourth separation zone at substantially the same temperature, and at a reduced pressure below about 200 p.s.i.g., to provide as said $C_4+$ fraction a fourth liquid phase comprising butanes and heavier normally liquid hydrocarbons and a fourth vapor phase; and
    (e) condensing said second vapor phase and separating the condensed vapors in a fifth separation zone at a temperature in the range of about 60° F. to about 140° F. and a reduced pressure below about 200 p.s.i.g. to provide a fifth vapor phase principally comprising butanes, pentanes, propane and lighter gaseous components, and recovering from said fifth separation zone said absorption medium principally comprising hexanes and heavier normally liquid hydrocarbons.

2. The process of claim 1 further characterized in that said conversion product effluent is at a temperature of from about 700° F. to about 950° F., and under a pressure of from about 700 p.s.i.g. to about 4,000 p.s.i.g.

3. The process of claim 1 further characterized in that said second separation zone is maintained at conditions of temperature and pressure selected to provide a second liquid phase comprising at least about 90.0% by volume of hydrocarbons boiling above about 400° F.

4. The process of claim 1 further characterized in that said absorption medium comprises at least about 85.0% by volume of hexanes and heavier hydrocarbons.

5. The process of claim 1 further characterized in that said absorption medium is employed to absorb at least the major portion of propane and heavier hydrocarbons from said fourth and fifth vapor phases, to produce a normally gaseous mixture containing less than about 5.0 mol percent propane and heavier hydrocarbons.

References Cited
UNITED STATES PATENTS

| | | | |
|---|---|---|---|
| 1,990,868 | 2/1935 | Heid | 208—104 |
| 2,485,073 | 10/1949 | Shiffler et al. | 208—101 |
| 2,952,616 | 9/1960 | Hausch | 208—104 |
| 2,985,583 | 5/1961 | Gilmore | 208—101 |
| 3,308,060 | 3/1967 | Ellis | 208—366 |

DELBERT E. GANTZ, *Primary Examiner.*

H. LEVINE, *Assistant Examiner.*